United States Patent [19]

Brogdon et al.

[11] Patent Number: 4,640,153

[45] Date of Patent: Feb. 3, 1987

[54] ACCESSORY DRIVE FOR A TURBINE ENGINE

[75] Inventors: James W. Brogdon, Daphne; Kenneth D. Allen; John S. Barton, both of Mobile, all of Ala.; Raymond J. Hicks, Llandrindod Wells, United Kingdom

[73] Assignee: Teledyne Industries, Inc., Los Angeles, Calif.

[21] Appl. No.: 559,646

[22] Filed: Dec. 9, 1983

[51] Int. Cl.4 .............................................. F16H 57/10
[52] U.S. Cl. ..................................... 74/789; 60/39.33; 60/39.142; 415/121 R; 415/122 R
[58] Field of Search ....................... 415/121 R, 122 R; 60/39.33, 39.142; 74/789

[56] References Cited

U.S. PATENT DOCUMENTS

| | | | |
|---|---|---|---|
| 1,977,553 | 10/1934 | Halford | 74/410 |
| 2,269,916 | 1/1942 | Price | 74/606 X |
| 2,583,872 | 1/1952 | Newcomb | 60/39.33 |
| 2,618,119 | 11/1952 | Redding et al. | 60/39.33 |
| 2,689,456 | 9/1954 | White | 60/39.33 X |
| 2,737,018 | 3/1956 | Bain | 60/39.33 |
| 2,951,631 | 9/1960 | Gregory | 230/122 |
| 2,977,758 | 4/1961 | Haworth et al. | 60/39.31 |
| 2,978,869 | 4/1961 | Hiscock et al. | 60/39.33 |
| 3,093,009 | 6/1963 | Collman et al. | 74/410 |
| 3,100,405 | 8/1963 | Brass | 74/789 X |
| 3,172,260 | 3/1965 | Chute | 60/39.75 |
| 3,214,990 | 11/1965 | Jekat | 74/421 |
| 3,307,426 | 3/1967 | Whitaker | 60/39.142 X |
| 3,520,632 | 7/1970 | Brunkhardt | 415/122 |
| 3,521,505 | 7/1970 | Sebring | 60/39.142 X |
| 3,632,222 | 1/1972 | Cronstedt | 415/122 X |
| 3,635,576 | 1/1972 | Wieckmann | 415/65 |
| 3,761,205 | 9/1973 | Cronstedt | 415/122 R |
| 3,779,675 | 12/1973 | Magdhuber et al. | 418/199 |
| 3,853,432 | 12/1974 | Cronstedt | 415/122 R |
| 3,880,547 | 4/1975 | Hagen | 60/39.16 |
| 4,105,372 | 8/1978 | Mishina et al. | 415/122 R |
| 4,118,927 | 10/1978 | Kronogard | 60/39.16 |
| 4,167,851 | 9/1979 | Kinoshita | 60/39.33 X |
| 4,214,440 | 7/1980 | Rucker | 60/39.33 X |

Primary Examiner—Kenneth J. Dorner
Assistant Examiner—Dwight G. Diehl
Attorney, Agent, or Firm—Gifford, Groh, VanOphem, Sheridan, Sprinkle and Dolgorukov

[57] ABSTRACT

A turbine engine construction comprises an accessory drive mechanism in which accessories are mounted circumferentially around the turbine casing. The engine includes a planetary gear mechanism driven by a shaft extending axially outward from compressor and turbine sections of the engine, and forwardly of the air intake in the turbine casing. Accessory drive assembly includes a planetary gear mechanism having a ring gear exposed through circumferentially spaced apertures in the turbine casing to driven gears extending outwardly from accessory housings secured to the periphery of the turbine casing.

6 Claims, 5 Drawing Figures

ACCESSORY DRIVE FOR A TURBINE ENGINE

BACKGROUND OF THE INVENTION

1. Field of the Present Invention

The present invention relates generally to turbine engine constructions having means for mechanically driving accessories such as pumps, and more particularly to an accessory drive system employing a planetary gear system driving the accessory.

2. Description of the Prior Art

There are many previously known mechanisms for mechanically driving accessories such as fuel pumps, lubricant pumps, cooling pumps, generators and the like, by a turbine engine. Typically, a mechanical transmission is driven by the turbine shaft, and since the speed of the turbine shaft is substantially greater than the speed at which the accessory can be driven, the transmission includes a speed reducer for driving the accessory at a normal operating speed. The transmission speed reducing mechanism often comprises a gear arrangement mounted in a housing which is then secured to the outer casing of the turbine engine. The bulk, weight and size of such mechanisms can substantially increase the bulk, weight and size of the turbine engine installation. Such disadvantages are especially apparent when the gear mounted on the turbine shaft for rotation therewith, is coupled to a driven gear of the transmission which is rotatably mounted about an axis which extends radially outward from the turbine shaft. While such an arrangement permits a turbine accessory to be mounted on the outside of the turbine casing, it substantially increases the breadth and off-axis bulk of the turbine engine installation.

One previously known device which incorporates a speed reduction gear mechanism within the turbine casing itself as shown in U.S. Pat. No. 2,951,631 to Gregory. Gregory discloses a planetary gear system within the compressor stage of a turbine engine. The annular ring gear includes a plurality of blades intermediate the inner and outer peripheries of the ring gear so that the ring gear can be disposed across the fluid inlet of the compressor. Such a construction is disadvantageous for the reason that the planetary gear system effects the flow of fluid through the compressor. In addition, the inclusion of vanes in the gears substantially increases the weight and bulk of the gear. Accordingly, such a construction introduces energy losses which reduce the efficiency of the turbine engine. Moreover, such a complex structure increases the cost and complexity of manufacturing the apparatus.

SUMMARY OF THE PRESENT INVENTION

The present invention overcomes the above-mentioned disadvantages by providing a planetary gear mechanism for driving an accessory which is driven by, but spaced apart from, the compressor section of the turbine engine. More particularly, the turbine engine includes a casing having a radially aligned intake port or opening at the front of the compressor, while a shaft extends axially forwardly from the compressor to provide a drive for the gear mechanism. The gear mechanism includes a planetary ring gear having an outer rack which is disposed axially forward of the intake opening in the turbine casing. The turbine casing also includes at least one opening adjacent the outer rack of the ring gear through which a driven element of an accessory can engage the outer rack of the ring gear. Preferably, the accessory includes a housing which substantially encloses the aperture in the casing.

Since the gear mechanism is separated from the compressor and turbine sections of the turbine engine, the casing portion that houses the gear mechanism can have substantially less radial breadth than previously known accessory drive mechanisms. Thus, the breadth of the turbine engine including the attached accessories can be substantially smaller than previously known turbine engines having driven accessories mounted thereto. Moreover, since the gear system is not disposed radially adjacent to or within the portions of the turbine structure defining the flow passages through the compressor or turbine stages of the turbine engine, the gear mechanism does not obstruct the flow of the fluids through the turbine engine and the parts can be substantially lighter and less bulky than previously known planetary gear drive systems. Moreover, the turbine casing can be provided with apertures substantially around the entire periphery of the outer rack of the ring gear so that any desired number of accessories can be driven from the single ring gear. Since the actual use of the turbine engine, and the number of accessories required, is not often known at the time the engine itself is built, the casing of turbine engine is preferably constructed to include a plurality of apertures adjacent the ring gear which can be easily covered or utilized as desired.

A further advantage of the present invention is that the turbine engine including accessories has a narrower breadth, which dimension can be more critical than the length of the turbine, especially in turbines employed in aircraft. Furthermore, alignment of the accessory drives parallel to the turbine axis eliminates torque about axes perpendicular to the axis of the turbine shaft.

BRIEF DESCRIPTION OF THE DRAWING

The present invention will be more clearly understood by reference to the following detailed description of a preferred embodiment of the present invention, when read in conjunction with the accompanying drawing in which like reference characters refer to like parts in the several views and in which.

DETAILED DESCRIPTION OF THE PREFERRED EMBODIMENT OF THE PRESENT INVENTION

Figure 1:
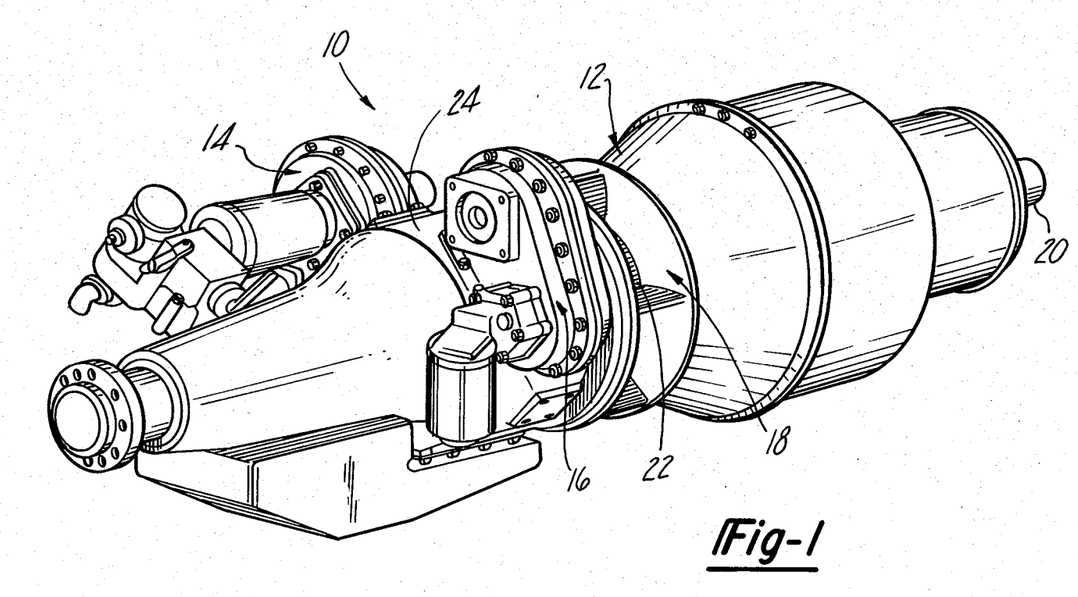
FIG. 1 is a perspective view of a turbine engine in accordance with the present invention.

Referring first to FIG. 1, the turbine engine 10 according to the present invention is thereshown comprising a turbine casing 12 having a casing portion 24 to which accessory housings 14 and 16 are mounted. The casing 12 includes an air intake 18 and an exhaust outlet 20. The inlet 18 comprises a plurality of radially aligned openings 22 which receive the ambient air which is directed toward the compressor contained within the turbine casing 12. Turbine casing portion 24 houses the gear mechanism for driving the accessories contained within the housings 14 and 16.

Figure 3:
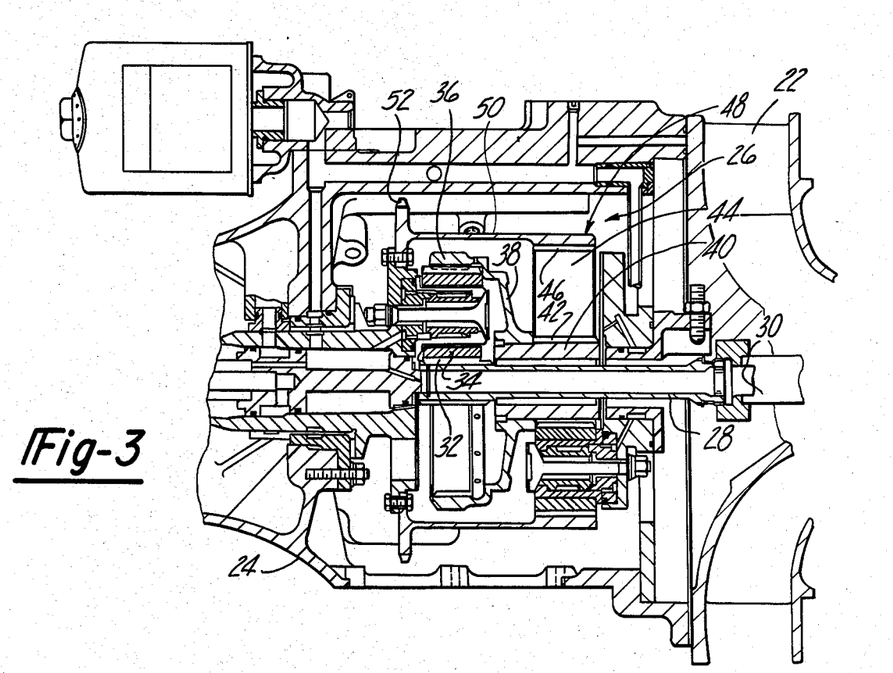
FIG. 3 is a sectional view taken substantially along line 3—3 of FIG. 2.

As best shown in FIG. 3, casing portion 24 encloses a planetary gear system 26. The gear system includes a shaft 28 axially aligned with and axially extending from the front compressor stub 30. The other end of the shaft 28 includes radially extending gear teeth 32 engaging with peripheral teeth on the gear 34. The teeth on the periphery of the gear 34 are in turn engaged with the teeth at one end of the gear ring 36. The gear ring 36 includes a conical sleeve or web portion 38 which extends axially rearwardly and radially inwardly from the gear ring 36. The other end of web portion 38 is fixedly secured to a sleeve 40 adapted to rotate about the shaft 28. The sleeve 40 includes radially extending gear teeth 42 adapted to engage a further gear 44. The gear 44 in turn engages an inner peripheral gear rack 46 on the ring gear 48. The ring gear 48 includes an axially extended body portion 50 connecting the inner peripheral gear rack 46 with the outer peripheral gear rack 52.

Figure 2:
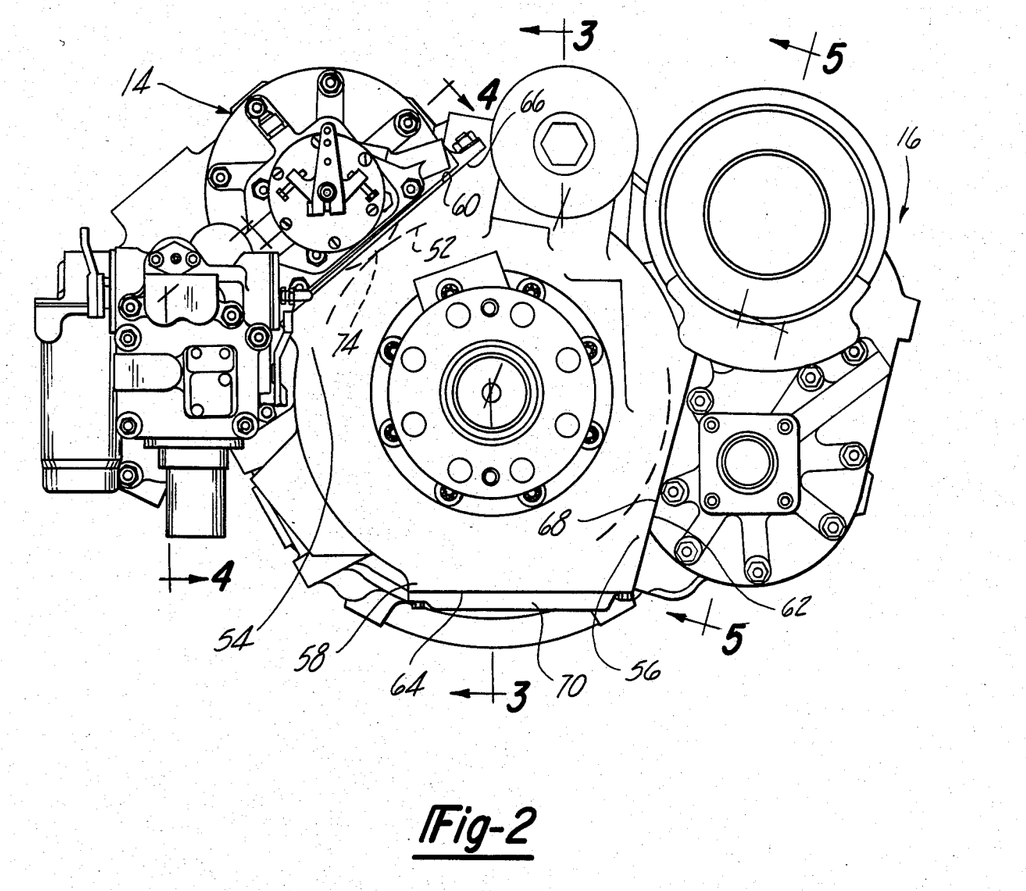
FIG. 2 is a front view of the turbine engine shown in FIG. 1.

Referring now to FIG. 2, the outer peripheral gear rack 52 of the ring gear 48 is confined within the casing 12, as the perimeter of the casing portion 24 is disposed radially outwardly from the ring gear outer rack 52. The casing further includes radially expanded portions 54, 56 and 58 which are machined flat to form attachment surfaces 60, 62 and 64 respectively. The raised portions 54, 56 and 58 are peripherally formed around apertures in the casing 12 through which driven elements in the accessories can extend into the casing 12 and engage with the gear rack 52 on the ring gear 48. Although three apertures and corresponding attachment surfaces are shown in the casing 12 in FIG. 2, it will be understood that any desired number of such apertures and expanded portions can be provided at substantially any desired position around the periphery of the casing 12 within the casing portion 24.

Still referring to FIG. 2, accessory housing 14 includes a mating surface 66 adapted to mate with the surface 60 on the casing 12. Similarly, accessory housing 16 includes a mating surface 68 for attachment to the casing 12. Moreover, in view of the fact that the number of accessories to be driven by turbines not always predetermined when the turbine is constructed, unused access apertures can be closed by a closure plate, such as the plate 70 which is shown bolted and sealed against the expanded portion 58 by mating with the attachment surface 64.

Figure 4:
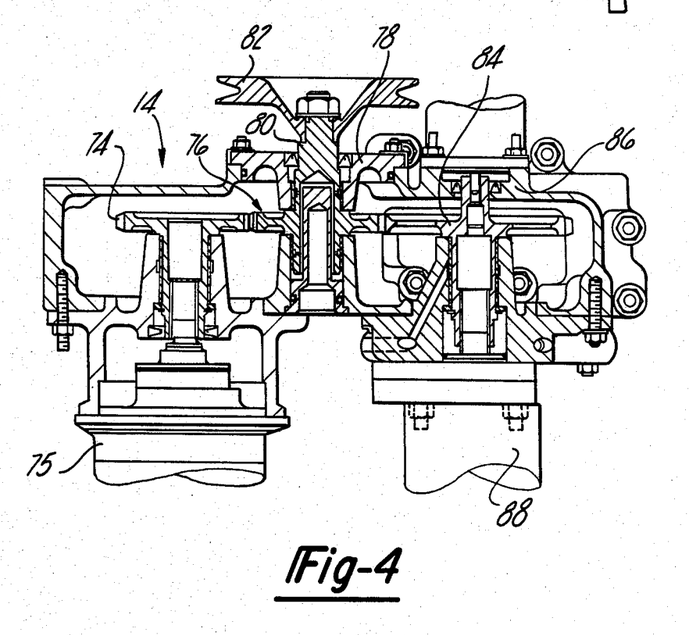
FIG. 4 is a sectional view taken substantially along line 4—4 in FIG. 2.

Referring now to FIG. 4, the interior of the accessory housing 14 is shown. Insofar as the present invention is concerned, the housing 14 rotatably supports the gear 74, which as best shown in FIG. 2 extends partly out of the housing 14 through an aperture in the housing 14 so as to mate with the ring gear 48 in the casing 12. The gear 74 is coupled to driven accessory 75. In addition, gear 74 is in turned engaged with a gear shaft 76 in an intermediate housing portion 78. The gear shaft 76 includes an elongated stem 80 rotatably journaled in the housing 78 and which extends outwardly from one end of housing 78. A drive pulley 82 secured to the extending end of the stem 80 provides external means for driving an additional accessory which can be operatively connected to the pulley 82. In addition, gear shaft 76 is in turn engaged with a gear shaft 84 in the lower accessory housing 86. The gear shaft 84 can be operatively connected to a further accessory such as the pump 88.

It is to be understood that although only the driven gear wheel 74 is operatively engaged with ring gear 48, the other housings 78 and 86 can be peripherally secured in circumferentially spaced positions about the casing 12, while still being driven by the planetary gear mechanism of the engine. Nevertheless, it is also to be understood that additional direct connections with the ring gear 48 are also an important feature of the present invention. In any event, both directly driven accessories and indirectly driven accessories serve to minimize the breath of the turbine engine when they are circumferentially spaced around the turbine casing, and especially since the diameter of the turbine casing portion 24 can be of reduced diameter when the gear mechanism 26 is constructed as discussed above.

Figure 5:
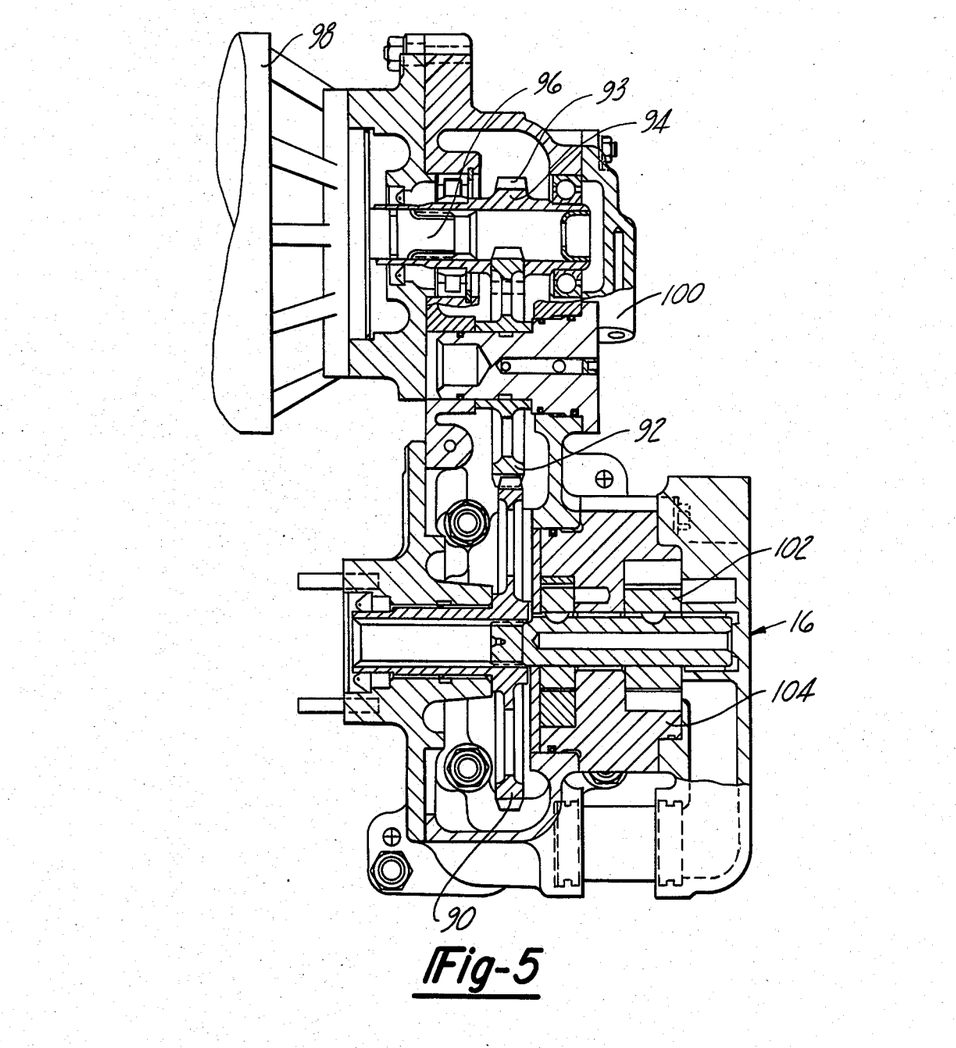
FIG. 5 is a sectional view taken substantially along line 5—5 of FIG. 2.

Referring now to FIG. 5, the inside of accessory housing 16 is thereshown having means for rotatably supporting a gear 90 therein. The gear 90 extends partly out of the housing 16 through an aperture in the housing so as to engage the ring gear 48 in casing 12. The gear teeth of the gear 90 are in turn engaged with the teeth of the gear 92, which is in turn engaged with the gear shaft 94 which is locked to the shaft 96 extending outwardly from the generator 98. Although the gear-toothed sleeve 94 extends axially rearwardly from the gear teeth 93, it can also be seen that it extends axially forward of the gear teeth 93. Thus, when the housing plate 100 is removed from the remaining housing structure, the gear sleeve 94 can be connected to a device forwardly of the sleeve 94 as well as to the generator rearwardly of the gear sleeve 94.

Still referring to FIG. 5, it can be seen that the gear 90 is coaxially secured to a pump impeller 102 within a pump housing portion 104 incorporated with the housing 16. The driven member, gear 90, provides direct actuation of a pump, whereas the gear 92 adjusts the speed of rotation for accessories connected to the gear sleeve 94.

Having thus described the important structural features of the present invention, it will be understood that the operation of the accessory drive has several advantages. In particular, at least one accessory can be directly driven by the ring gear of the present invention at a speed substantially reduced from the speed of the compressor of the turbine engine so that additional accessories operate at normal speed. It can also be seen that the driven members engaged against the planetary ring gear can be engaged against speed reducer or enhancer gears such as the gears 78 or 94 respectively. Nevertheless, the turbine casing construction of the present invention permits accessories to be mounted at numerous circumferential positions around the turbine casing as desired to provide direct connection between the planetary ring gear and the driven gear of an accessory. A further advantage is that relatively large accessories can be directly connected to the planetary gear system and thus closely adjoined to the periphery of the turbine casing, while small accessories can be positioned outside the casing and indirectly coupled with the planetary gear system without substantially increasing the breadth of the turbine engine.

Moreover, since the planetary gear system is located away from the compressor and turbine sections of the turbine engine, the gears can be made more compact than previously known accessory driven mechanisms. Moreover, it will be noted that the ring gear 36 having an axially extended and radially inwardly inclined, web portion provides a substantial reduction in the radial width of the planetary gear system and thus serves to reduce the cross-section of the casing 24 housing the planetary gear system. Thus, in an application where minimum breadth of the turbine engine is desirable, the turbine engine having the accessory drive mechanism of the present invention offers substantial space saving advantages over the previously known turbine engine accessory drive mechanisms.

Having thus described my invention, many modifications thereto will become apparent to those skilled in the art to which it pertains without departing from the scope and spirit of the present invention as defined in the appended claims.

What is claimed is:

1. In combination:
   a radial flow turbine engine having a main shaft and a casing with air inlets open radially at one end, and an accessory drive comprising:
   an accessory housing positioned axially adjacent said one end of the turbine engine casing,
   a gear ring rotatably mounted within said accessory housing,
   means for mechanically drivingly connecting said gear ring to said turbine main shaft, said connecting means comprising a planetary gear arrangement contained in said accessory housing,
   said accessory housing having a plurality of apertures open to said gear ring and circumferentially spaced from each other,
   at least one accessory having a driven gear, and
   means for mounting said at least one accessory to said accessory housing so that said accessory registers with one of said plurality of apertures and so that said gear ring meshes with said driven gear,
   wherein each aperture is adapted for connection with a separate accessory.

2. For use in conjunction with a radial flow turbine engine having a main shaft and a casing with air inlets open radially at one end, an accessory drive comprising:
   an accessory housing positioned axially adjacent said one end of the turbine engine casing,
   a gear ring rotatably mounted within said accessory housing,
   means for mechanically drivingly connecting said gear ring to said turbine main shaft, said connecting means comprising a planetary gear arrangement contained in said accessory housing,
   said accessory housing having a plurality of apertures open to said ring gear and circumferentially spaced from each other,
   at least one accessory having a driven gear, and
   means for mounting said at least one accessory to said accessory housing so that said accessory registers with one of said plurality of apertures and so that said drive gear meshes with said driven gear,
   wherein each aperture is adapted for connection with a separate accessory.

3. The invention as defined in claim 2 wherein at least a portion of said accessory housing is substantially cylindrical and wherein said ring gear is disposed in said substantially cylindrical portion.

4. The invention as defined in claim 2 and comprising means for closing at least one of said apertures.

5. The invention as defined in claim 2 wherein said main shaft and said ring gear are coaxial.

6. The invention as defined in claim 5 wherein said main shaft includes a gear sleeve coaxially mounted to the main shaft for rotation therewith, and said planetary gear arrangement comprises at least one intermediary gear engaging said gear sleeve and the inner periphery of said ring gear.

* * * * *

UNITED STATES PATENT AND TRADEMARK OFFICE
CERTIFICATE OF CORRECTION

PATENT NO. : 4,640,153

DATED : February 3, 1987

INVENTOR(S) : James W. Brogdon et al

Page 1 of 3

It is certified that error appears in the above-identified patent and that said Letters Patent is hereby corrected as shown below:

Col. 1, line 37, delete "as" and insert --is--;

Col. 2, line 63, delete "inlet" and insert --intake--;

Col. 3, line 6, before "gear" insert --planet--;

Col. 3, line 7, before "gear" insert --planet--;

Col. 3, line 14, before "gear" insert --planet--(both occurrences);

Col. 3, line 25, delete "raised" and insert --expanded--;

Col. 3, line 27, delete "12" and insert --24--;

Col. 3, line 28, delete "12" and insert --24--;

Col. 3, line 31, delete "12" and insert --24--;

Col. 3, line 41, before "not" insert --is--;

Col. 3, line 54, delete "turned" and insert --turn--;

Col. 4, line 2, after "mechanism: insert --26--;

Col. 4, line 2 after "engine" insert --10--;

Col. 4, line 7 delete "breath" and insert --breadth--;

Col. 4, line 11, after "constructed", insert --in two stages--;

Col. 4, line 14, before "gear", insert --driven--(both occurrences);

Col. 4, line 18, delete "shaft" and insert --sleeve--;

UNITED STATES PATENT AND TRADEMARK OFFICE
CERTIFICATE OF CORRECTION

PATENT NO. :   4,640,153

DATED      :   February 3, 1987

INVENTOR(S):   James W. Brogdon et al

It is certified that error appears in the above-identified patent and that said Letters Patent is hereby corrected as shown below:

Col. 4, line 21, delete "gear-toothed" and insert --gear--;

Col. 4, line 24, after "structure" insert --16--;

Col. 4, line 26, after "generator" insert --98--;

Col. 4, line 39, after "gear" insert --48--;

Col. 4, line 43, delete "planetary";

Col. 4, line 44, after "gear" insert --48--;

Col. 4, line 45, after "gears" (second occurrence), delete "78 or 94 respectively" and insert --74 or 92--;

Col. 4, line 50, delete "planetary";

Col. 4, line 50, after "gear" (first occurrence), insert --48--;

UNITED STATES PATENT AND TRADEMARK OFFICE
CERTIFICATE OF CORRECTION

PATENT NO. : 4,640,153  Page 3 of 3

DATED : February 3, 1987

INVENTOR(S) : James W. Brogdon et al

It is certified that error appears in the above-identified patent and that said Letters Patent is hereby corrected as shown below:

Col. 4, line 53, after "system", insert --26--;

Col. 4, line 56, after "system", insert --26--;

Col. 4, line 58, after "system", insert --26--;

Col. 4, line 63, after "inclined", delete --,--;

Col. 4, line 64, after "portion", insert --38--;

Col. 4, line 64,65, delete "substantial reduction in the radial width of the" insert --two stage--;

Col. 4, line 65, after "system", insert --26--.

Signed and Sealed this

Sixth Day of October, 1987

Attest:

DONALD J. QUIGG

Attesting Officer　　Commissioner of Patents and Trademarks